United States Patent [19]

Howser

[11] Patent Number: 4,618,057
[45] Date of Patent: Oct. 21, 1986

[54] CHAIN-LINK BELT CONVEYOR WITH ADJUSTABLE PARALLEL OFFSET AND VARIABLE RADIUS GUIDE

[75] Inventor: M. Gene Howser, Cartersville, Ga.

[73] Assignee: Production Systems, Inc., Marietta, Ga.

[21] Appl. No.: 664,228

[22] Filed: Oct. 24, 1984

[51] Int. Cl.$^4$ ............................................. B65G 21/10
[52] U.S. Cl. ................................................. 198/861.2
[58] Field of Search .............. 198/864, 862, 852, 594, 198/586, 309, 588, 590, 463.2, 861.2

[56] References Cited

U.S. PATENT DOCUMENTS

| | | | |
|---|---|---|---|
| 2,210,655 | 8/1940 | Doberstein | 198/727 |
| 2,250,933 | 7/1941 | Manierre | 198/852 |
| 2,743,002 | 4/1956 | Cartlidge | 198/863 |
| 3,842,968 | 10/1974 | Owens | 198/851 |
| 4,139,087 | 2/1979 | Westhoff et al. | 198/864 |

FOREIGN PATENT DOCUMENTS

| | | | |
|---|---|---|---|
| 1342483 | 1/1974 | United Kingdom | 198/861.2 |
| 2025878 | 1/1980 | United Kingdom | 198/861.2 |
| 578473 | 10/1977 | U.S.S.R. | 198/864 |

Primary Examiner—Joseph E. Valenza
Assistant Examiner—Kyle E. Shane
Attorney, Agent, or Firm—Jones & Askew

[57] ABSTRACT

An articulated conveyor comprising a conventional endless-loop chain-link conveyor belt traveling over a fixed frame section, an adjustable frame section mounted for translational movement on a guide carrier, and a floating frame section pivotably mounted to connect the fixed section to the adjustable section. The guide carrier permits translational movement of the adjustable frame section in a direction perpendicular to the longitudinal axes of the adjustable frame section and the fixed frame section to provide parallel offset of the adjustable section with respect to the fixed section. Longitudinal guide slots in the upper and lower faces of the three frame sections engage center tabs on the bottom of the belt to guide the belt for travel along the frame sections. As the adjustable frame section is translatably offset, variable radius guides slidably mounted between the three frame sections permit the belt to turn through a smooth and continuous arc rather than having to turn sharply about a fixed pivot point, thereby avoiding the limitations imposed by the minimum possible turn radius inherent in the design of the chain-link conveyor belt.

7 Claims, 10 Drawing Figures

Fig_4

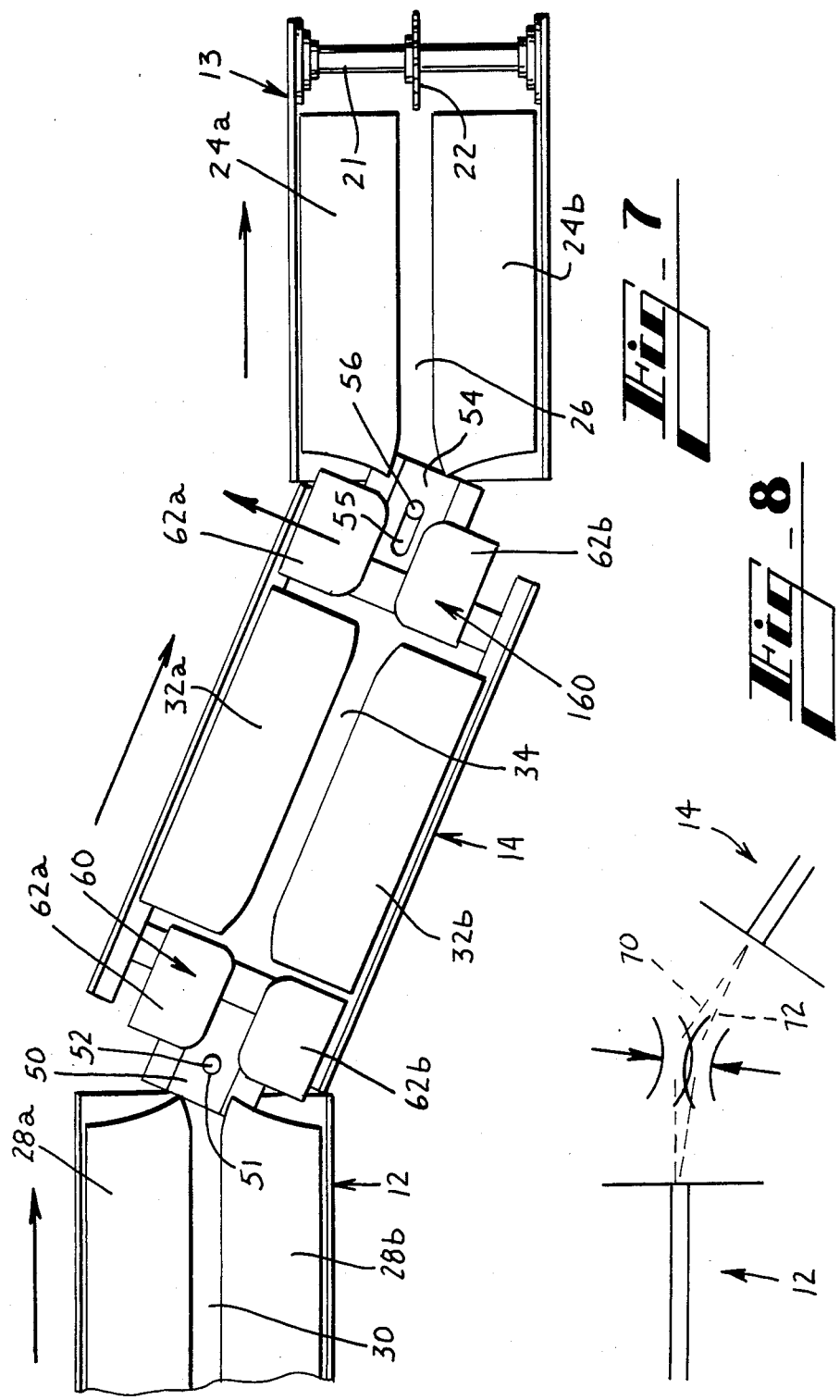

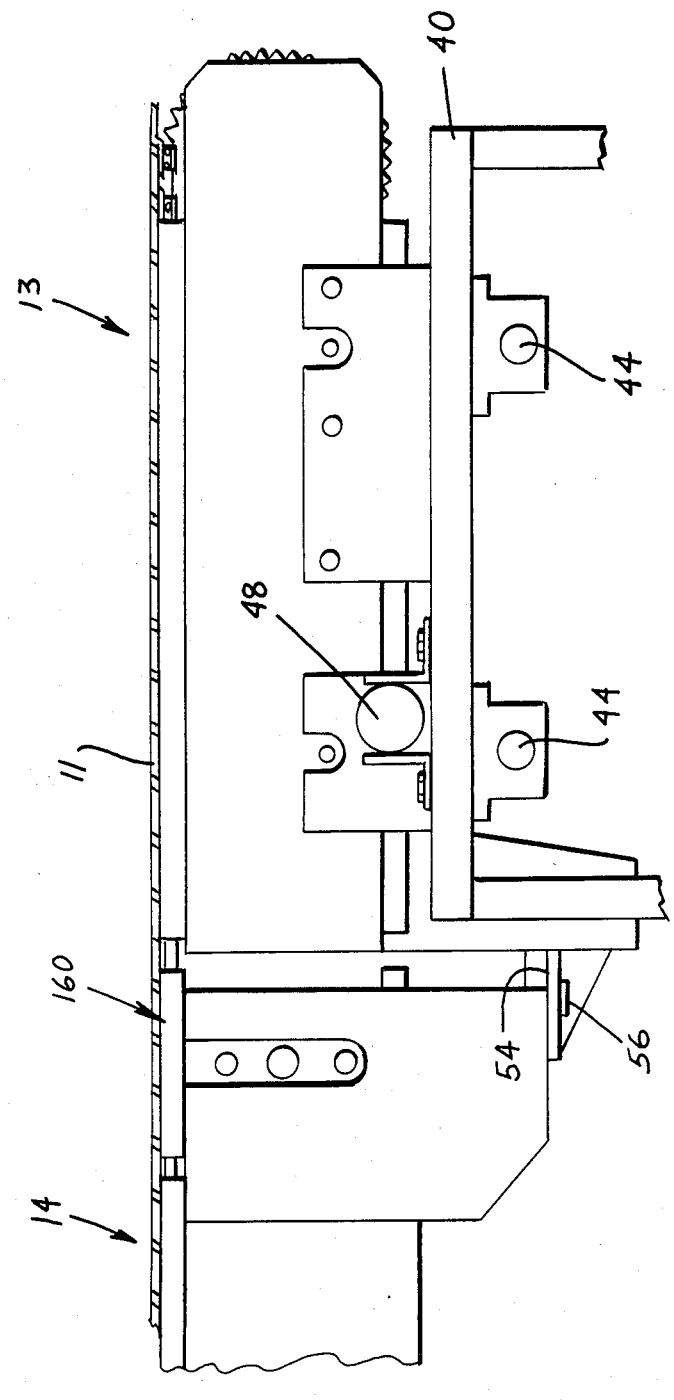

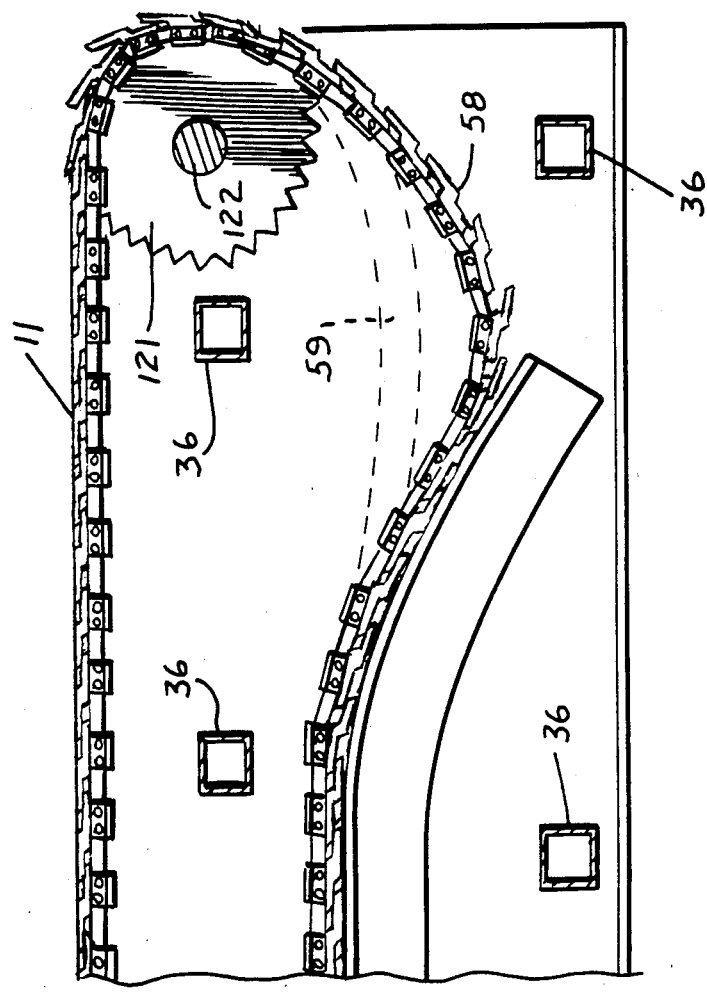

CHAIN-LINK BELT CONVEYOR WITH ADJUSTABLE PARALLEL OFFSET AND VARIABLE RADIUS GUIDE

TECHNICAL FIELD

This invention relates generally to chain-link belt conveyors, and more particularly to an improvement for a conventional chain-link belt conveyor providing continuously adjustable parallel offset of one section of the conveyor with respect to another.

BACKGROUND OF THE INVENTION

It is known to the art to provide articulated conveyors whereby one section of the conveyor can be disposed in various positions of adjustment with respect to the other. Typically, however, such a conveyor provides a discharge end or input end of the conveyor pivotably mounted to swing in an arcuate path. However, a conveyor with an end section restricted to arcuate movement cannot readily move to align with input or output stations disposed along a straight line. Accordingly, there is a need to provide for an articulated conveyor wherein one section of the conveyor is translationally adjustable with respect to another along a predetermined linear path to allow for various positions of adjustment of parallel offset of the conveyor.

One example of a prior-art conveyor including a discharge end restricted to movement on an arcuate path is shown in U.S. Pat. No. 2,210,655, which discloses an articulated conveyor with a swinging end trough section for use in a coal loading machine. The disclosed loading machine comprises a track-mounted truck having a gathering and loading element projecting forwardly from the forward end of the truck and mounted for horizontal and vertical swinging movement, and a discharge conveyor receiving material from the loading element. As a rear trough section of the discharge conveyor swings with respect to a forward trough of the conveyor, the walls of the connecting flexible trough section act on the ends of the conveyor flights to guide the conveyor element through its arcuate travel. In this manner, the rear trough section of the discharge conveyor can be swung from one side of the truck to the other in an arcuate motion to load coal onto coal cars.

As another example of the prior art, U.S. Pat. No. 2,743,002 describes an apparatus for adjustably angling the discharge chute of a conveyor, incorporating hydraulic cylinders to rotate the chute through an arcuate moment, and further incorporating load supporting knuckle arms to support the weight of the chute and its load. Flexible spring steel side plates properly guide the ends of the conveyor flights through the necessary arcuate travel as the discharge chute is swung with respect to the conveyor. Again, however, the adjustable trough section is pivotably mounted to swing in an arcuate motion.

SUMMARY OF THE INVENTION

Stated in general terms, the present invention comprises a conventional chain-link belt conveyor whereby one section of the conveyor is continuously translatably adjustable with respect to another. Stated somewhat more specifically, an endless-loop conveyor belt travels continuously over three separate sections of the conveyor, which are connected at two pivot points. Each frame section includes longitudinal guide tracks which support the belt and its load and engage center tabs of the belt to guide it in its travel. A first frame section which may comprise the main body of the conveyor is fixed in a stationary position. An adjustable second frame section, which may comprise an input or discharge end of the conveyor, is supported on a carrier for translational movement along a predetermined linear path and is connected to the stationary frame section by a floating third frame section mounted on pivots at each of its ends. As the adjustable second section is translationally moved on its carrier to increase or decrease the parallel offset relative to the main body of the conveyor, the floating section rotates about its pivots to maintain contact between the adjustable section and the stationary section. At least one of the pivot mounts interconnecting the floating frame section with the stationary and adjustable sections also permits limited longitudinal extension and contraction, accomodating changes in overall length of the conveyor as the adjustable section is translated. As parallel offset is increased, the length of travel of the conveyor belt is also increased, and the travel of the belt is automatically adjusted by means of a catenary takeup.

To guide the conveyor belt as the parallel offset of the conveyor is adjusted, the present invention further comprises a variable radius guide at each pivot point which serves to vary the radius through which the conveyor belt must turn. As the adjustable section is offset, these variable radius guides "float" toward the centers of the "S"-shaped curves formed by the three frame sections, effectively increasing the turn radii of the conveyor belt. In this manner, it is possible to offset the conveyor through a greater travel before reaching the limitation imposed by the minimum turn radius inherent in the design of the chain-link conveyor belt.

Thus, it is an object of the present invention to provide an improved articulated conveyor apparatus.

It is another object of the present invention to provide an articulated conveyor wherein one section of the conveyor is translationally adjustable with respect to another along a predetermined linear path to allow for various positions of adjustment of parallel offset of the conveyor.

It is yet another object of the present invention to provide an apparatus for guiding an endless-loop conveyor belt between sections of the conveyor which serves to decrease the radius through which the belt must turn, thereby allowing the sections of the conveyor to be offset through a greater arc before encountering the limitation imposed by the minimum turn radius inherent in the design of the conveyor belt.

Other objects, features, and advantages of the present invention will become apparent upon reading the following specifications when taken in conjunction with the drawings and the appended claims.

BRIEF DESCRIPTION OF THE DRAWINGS

FIG. 7 is a top view of the conveyor of FIG. 1 with belt removed to show the variable radius guides.

FIG. 8 is a schematic depiction of a variable radius guide of the preferred embodiment in various positions of adjustment.

FIG. 9 is a side view of the adjustable frame section mounted on the guide carrier.

FIG. 10 is a side cross-sectional view of the fixed frame section showing the catenary take-up arrangement of the conveyor belt.

DETAILED DESCRIPTION OF THE DISCLOSED EMBODIMENT

Figure 1:
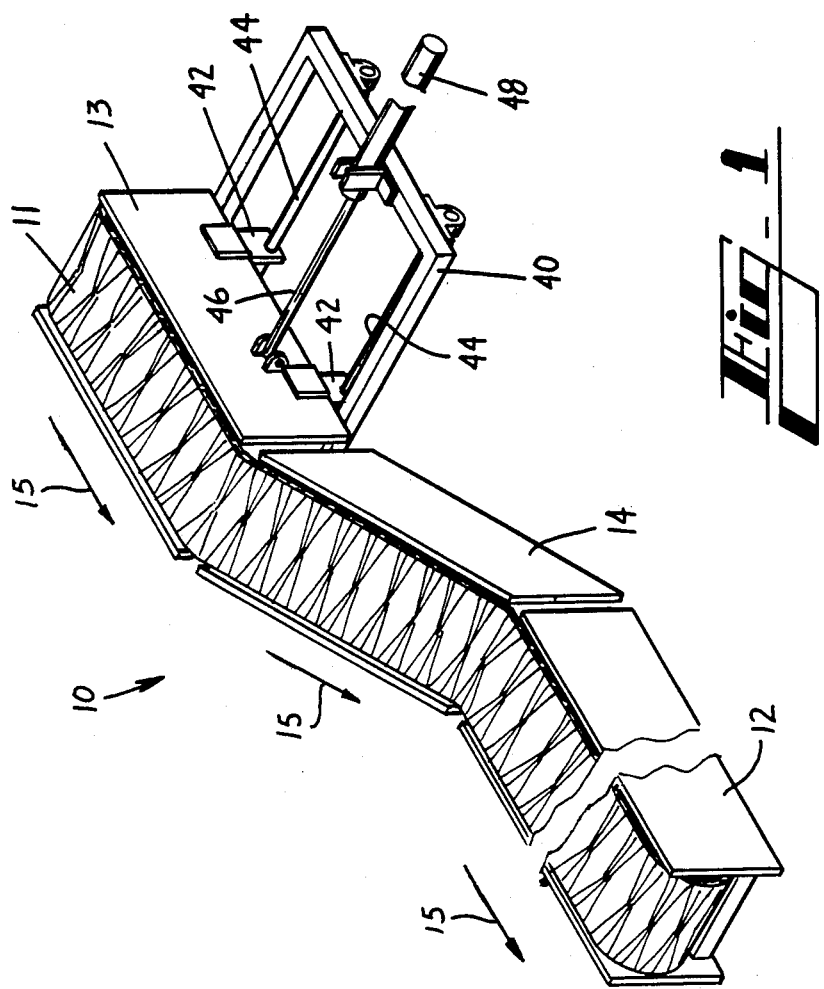
FIG. 1 is a perspective view of the preferred embodiment of the conveyor according to the principles of the present invention.

Referring now in more detail to the drawing, in which like numerals indicate like elements throughout the several views, FIG. 1 shows a conveyor 10 embodying the principles of the present invention, and comprising a conventional chain-link conveyor belt 11, a fixed first frame section 12, a translationally adjustable second frame section 13, and a floating third frame section 14 interconnecting the first and second frame sections.

The conveyor 10 is shown having the first section 12 of indeterminate length and arbitrarily comprising the main section of the conveyor. The belt 11 is powered to move in the direction indicated by the arrows 15, and the second frame section 13, supported for translational movement relative to the first section, is thus the discharge or outlet end of the conveyor. However, it will be seen that the translatable second frame section 13 can alternatively be the inlet end of the conveyor 10, with the belt 11 powered to move in the direction opposite the arrows 15.

Figure 2:
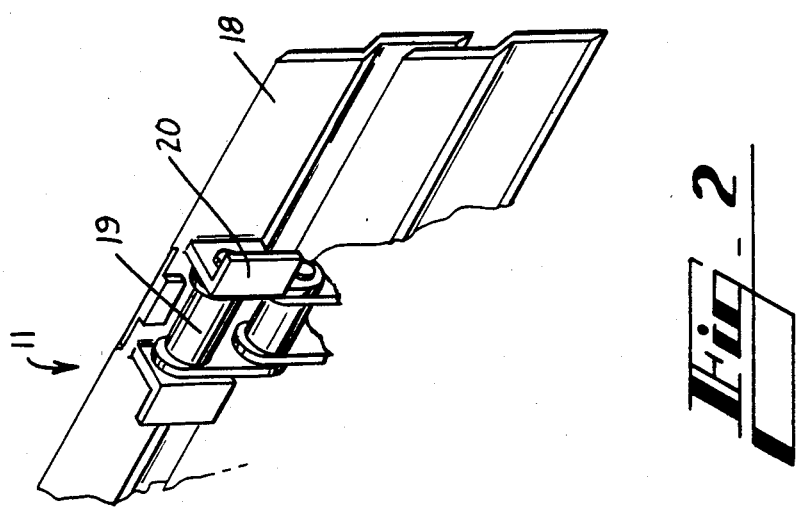
FIG. 2 is a bottom perspective view of a conveyor belt of the preferred embodiment shown in FIG. 1, comprising articulated flights and center guide tabs.
Figure 3:
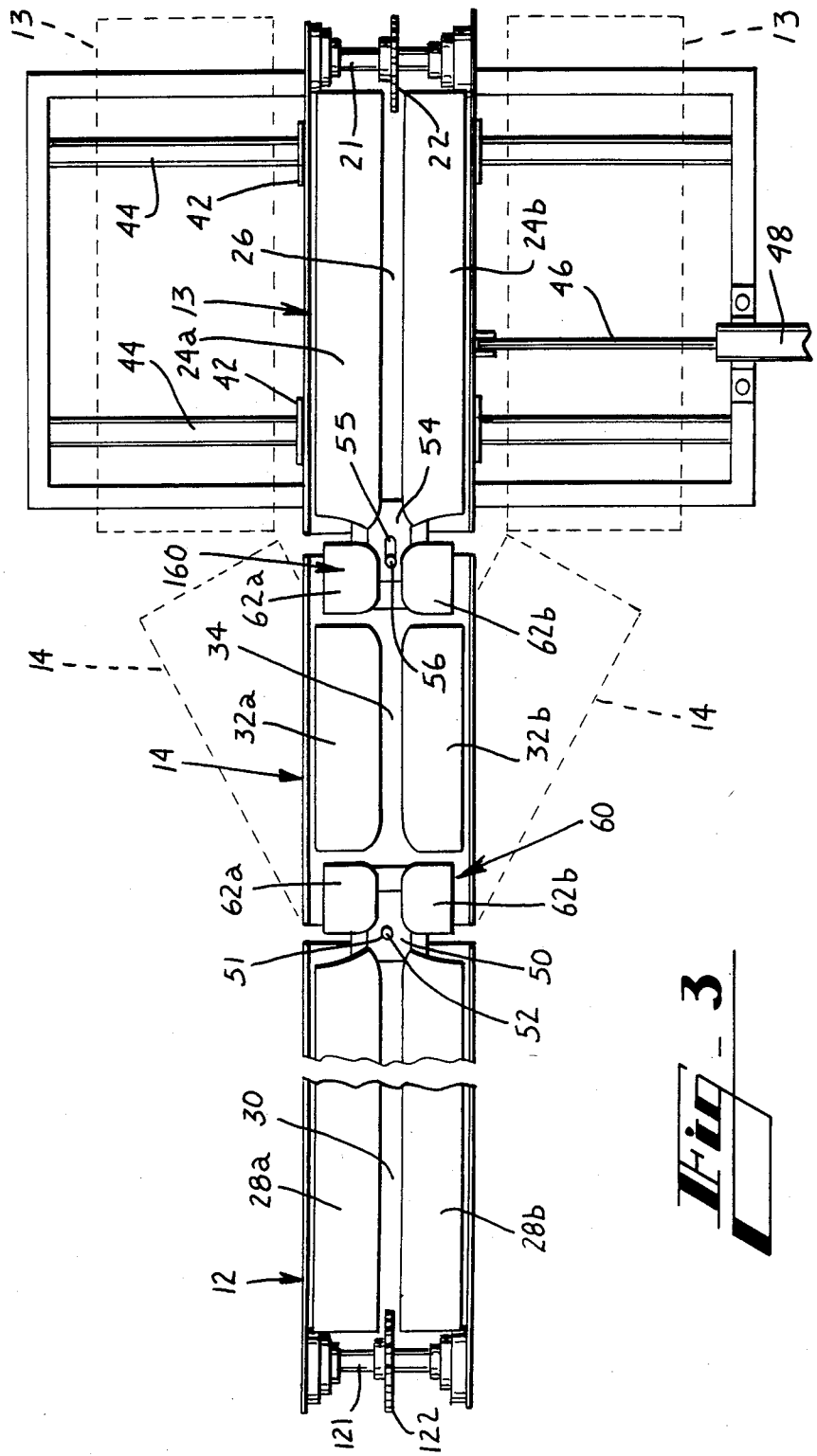
FIG. 3 is a plan view of the conveyor of FIG. 1, showing the translationally adjustable frame section in various positions of adjustment.

Conveyor belt 11 is a conventional continuous chain-link conveyor belt with laterally projecting articulated flights 18, longitudinal drive chain 19, and center guide tabs 20, as shown in FIG. 2. The belt 11 is driven by drive chain 19 engaging a sprocket gear 121 mounted on drive shaft 122 (FIG. 3) mounted on fixed frame section 12, turned by conventional drive means known to the art such as an electric motor (not shown). Idler gear 21 mounted on idler shaft 22 on the end of adjustable frame section 13 engages the drive chain 19 at the other end of the conveyor as the belt 11 turns downwardly to begin its return along the underside of the frame sections 13, 14 and 12. It will be understood that the drive means can be alternatively mounted to the adjustable frame section and operatively associated with gear 21 and shaft 22 to drive the belt, with gear 121 and shaft 122 serving as idlers. It will also be appreciated that other types of conveyor belts may be used with this conveyor, as may occur to those skilled in the art.

Figure 4:
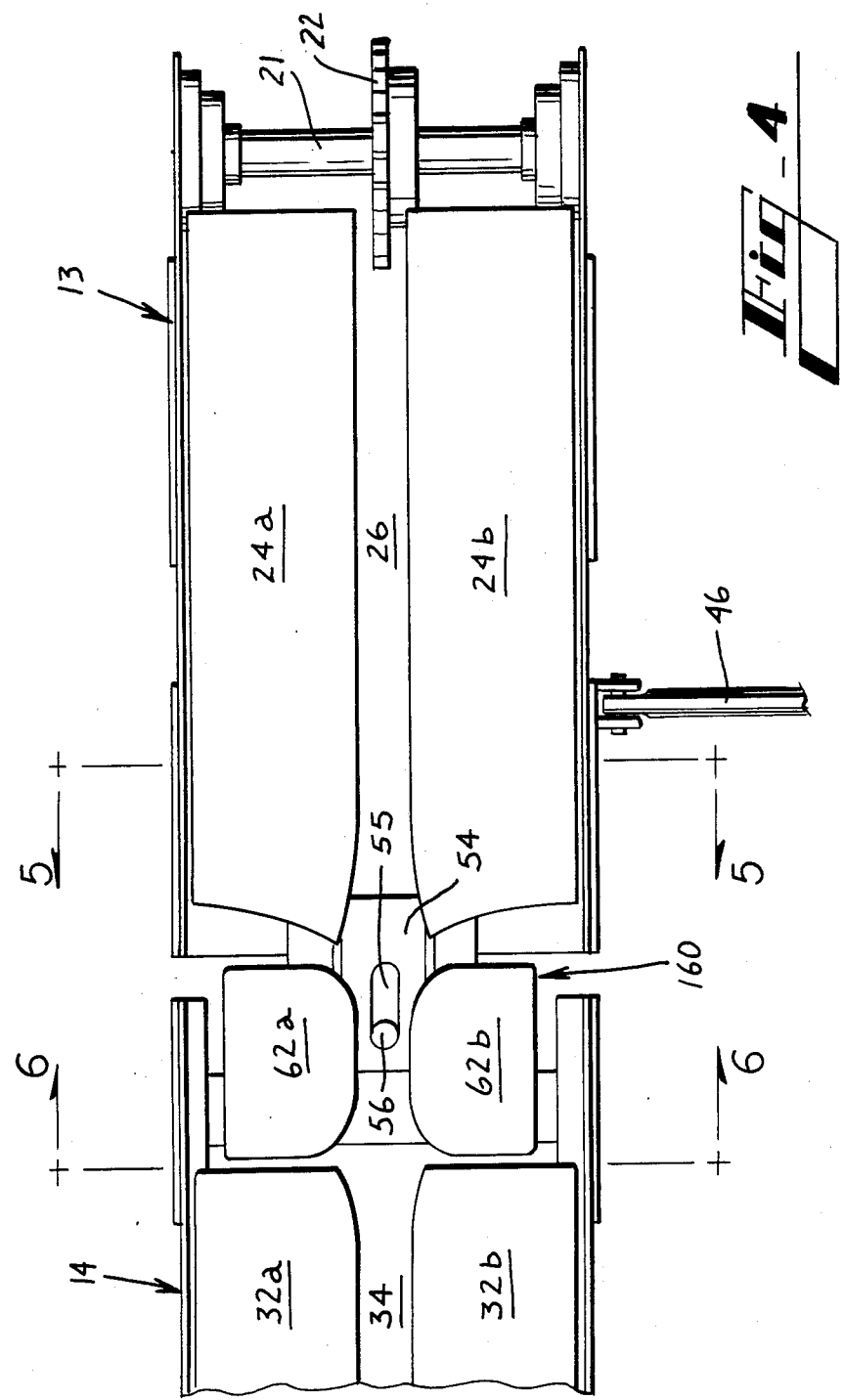
FIG. 4 is a partial top view of the conveyor of FIG. 1 with the belt removed.
Figure 5:
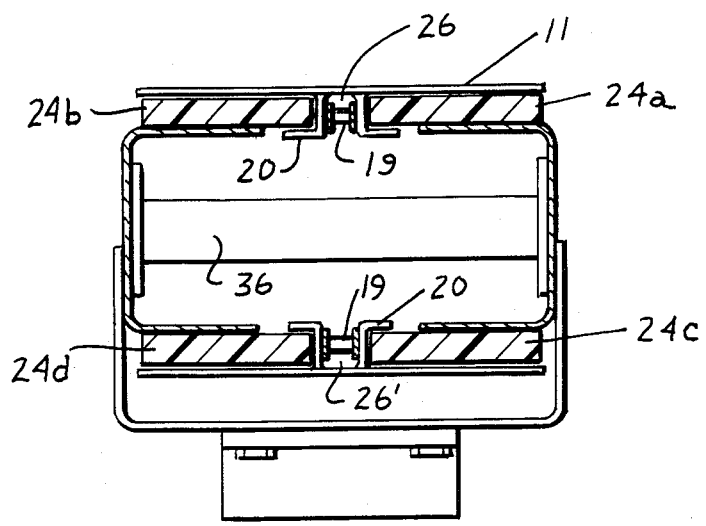
FIG. 5 is a cross-sectional view of the adjustable frame section along section line 5—5 of FIG. 4, depicting the conveyor belt engaging the upper and lower guide tracks.

As shown in FIGS. 4 and 5, translationally adjustable second frame section 13 includes two upper longitudinal guide tracks 24a, 24b of a durable and lowfriction material such as ultra-high molecular weight plastic or the like, laterally spaced apart from each other along the longitudinal center line of the frame sections to define upper central longitudinal guide slot 26. Two lower longitudinal guide tracks 24c, 24d, of ultra-high molecular weight plastic or the like, define lower central longitudinal return guide slot 26'. The guide slots engage the tabs 20 of the conveyor belt 11 on its travel and return along the fixed frame section 12. In the same manner, the fixed frame section 12 comprises upper longitudinal guide tracks 28a, 28b defining upper guide slot 30, and lower longitudinal guide tracks (not shown) defining a lower guide slot. Floating frame section 14 similarly comprises upper longitudinal guide tracks 32a, 32b defining upper guide slot 34, and lower longitudinal guide tracks (not shown) defining a lower guide slot. Transverse stiffening members 36 as shown in FIGS. 5 and 10 are disposed throughout the three frame sections to afford additional rigidity to the structure.

Translationally adjustable frame section 13 is supported for translational movement by guide carrier 40. Bearing collars 42 mounted on the bottom of adjustable frame section 13, as shown in FIG. 1, ride upon support rods 44 mounted on the guide carrier in a direction substantially perpendicular to the longitudinal axis of the adjustable frame section. Additionally, the guide carrier is disposed with respect to fixed frame section 12 to provide for translational movement of the adjustable frame section 13 in a direction substantially perpendicular to the longitudinal axis of the fixed frame section. In this manner, the longitudinal axis of adjustable frame section 13 is at all times parallel to the longitudinal axis of fixed frame section 12 as the adjustable frame section is laterally moved upon the guide carrier 40.

Translational motion of the adjustable frame section 13 is accomplished by an actuator such as push rod 44 powered by a double-action air cylinder 46. It will be appreciated that the translational movement of the adjustable end section, and hence the parallel offset of the conveyor, may be controlled manually, for example by a crank mechanism; or may be controlled automatically, as by air or hydraulic cylinders or by a motor with a closed chain loop or a screw drive, either upon activation by an operator or automatically at predetermined timed intervals.

Fixed frame section 12 and adjustable frame section 13 are bridged by floating frame section 14. Plate 50 (FIGS. 3 and 7) mounted at the end of floating frame section 14 includes circular hole 51 which receives pin 52 vertically mounted at the end of fixed frame section 12, to permit pivotal movement of the floating frame section with respect to the fixed frame section. Plate 54 mounted at the other end of the floating section 14 includes slot 55 which receives pin 56 mounted vertically at the end of adjustable frame section 13 to permit pivotal movement of the floating frame section with respect to the adjustable frame section. When the three frame sections are aligned, pin 56 is positioned toward the end of slot 55 closest to the center of the floating frame section 14. As adjustable frame section 13 is transversely offset, the distance between the end of the adjustable frame section and the end of the fixed frame section 12 increases. As this distance of separation increases, pin 56 mounted at the end of adjustable frame section 13 slides toward the end of slot 55 closest to the end of the floating frame section 14. When pin 56 reaches the end of the slot, the adjustable frame section can be offset no further.

Similarly, as the adjustable frame section is translationally offset and the distance between the adjustable frame section and the fixed frame section increases, the distance traveled by conveyor belt 11 also increases. To allow for this increase in belt travel, the conveyor incorporates a catenary takeup, shown in FIG. 10. With the frame sections aligned, the belt is at its shortest travel and follows the general path shown by the solid lines 58. As the adjustable frame section is offset, the travel of the belt increases, "slack" is removed from the catenary takeup, and the belt follows a path similar to that shown by dotted lines 59.

As the adjustable frame section 13 is transversely offset, the angles formed between the floating frame section 14 and the fixed frame section 12 and between the floating frame section and the adjustable frame section 13 increase equally. As is known to those skilled in the art, there is a predetermined minimum possible turn radius inherent in the design of the chain-link conveyor belt. Thus, there is a need to accomodate transverse movement of the adjustable frame section, and consequent increase in the angles between the various frame sections, without being limited by the minimum possible turn radius inherent in the design of the chain-link conveyor belt.

One method by which this obstacle can be overcome is to increase the length of the floating frame section. In this manner, the angles formed between the various frame sections are correspondingly less for the same amount of transverse movement of the adjustable frame section. However, since the floating frame section is suspended between its ends without any other means of support, and since additional length means additional weight, both of the frame section itself and the load it carries on the conveyor belt 11, it is often desirable to minimize the length of the floating section for reasons of weight.

Figure 6:
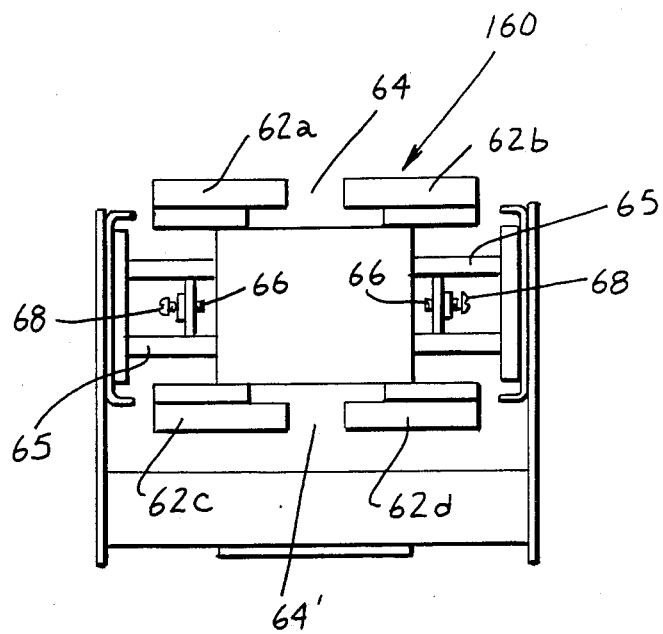
FIG. 6 is a cross-sectional view along section line 6—6 of FIG. 4, showing an elevational view of the variable radius guide.

A more advantageous approach comprises modifying the radius through which the chain-link conveyor belt must turn as the frame sections are pivotably offset with respect to each other. With conventional conveyors, as one conveyor section is pivotably offset with respect to another, the conveyor belt turns about a single pivot point, following a path shown schematically by dotted line 70 in FIG. 8. The conveyor of the present invention comprises variable radius guides 60 and 160, which are slidably mounted between the frame sections to maintain the travel of the belt in the guide tracks of the frame sections. As shown in FIG. 6, the variable radius guides 60 and 160 each comprise laterally supported left and right upper guide shoes 62a, 62b defining upper guide slot 64, and laterally supported left and right lower guide shoes 62c, 62d defining lower guide slot 64', which guide slots receive the center tabs 20 of the chain-link conveyor belt 11. The guides are slidably mounted on support rails 65 for translational movement perpendicular to the longitudinal axis of the conveyor. Stops 66, adjustable by means of adjustment screws 68, limit the maximum extent of lateral movement of the guide relative to the nominal longitudinal outer line of the conveyor.

A variable radius guide 60 is mounted on the end of the fixed frame section 12 adjacent to the floating frame section 14. As the fixed frame section 12 and floating frame section 14 are angleably offset, the conveyor belt 11 seeks the shortest straight-line distance between the respective guide tracks 24 and 32 and the guide tabs 20 on the underside of the belt are drawn against the guide shoes 62a, 62c or 62b, 62d, depending upon the direction of the angular offset. The variable radius guide 60 is thus urged laterally toward the inside of the turn radius so that the belt follows the path indicated schematically by dotted line 72 in FIG. 8. In this manner, the belt is permitted to make a smooth, continuous turn, rather than having to turn sharply about a fixed pivot point, so that the effective turn radius of the belt for a given angle between the frame sections is maximized.

It will be understood that the "floating" action of the variable radius guide is operating on the upper travel and lower return of the belt simultaneously, and that another variable radius guide 160 is similarly mounted for lateral sliding on the end of the adjustable frame section 13 adjacent to the opposite end of the floating frame section 14.

While the variable radius guide is especially adapted for use with the parallel-offset conveyor of the present invention, those skilled in the art will appreciate that the variable radius guide can also be advantageously adapted to a conventional articulated conveyor comprising only two sections, one of which is pivotably mounted for arcuate motion with respect to the other conveyor section, to maximize the arcuate movement of the end of the conveyor without encountering the minimum turn radius inherent in the design of the chain-link conveyor belt.

It will be appreciated that the end section which is translationally movable may comprise either the loading end of the conveyor or the discharge end; that one conveyor may comprise translationally adjustable sections at both the loading and discharge ends; and that the conveyor can be adjustably offset in the middle rather than at the end of the conveyor, all without departing from the scope and spirit of the appended claims.

Finally, it will be understood that the preferred embodiment of the present invention has been disclosed by way of example, and that other modifications may occur to those skilled in the art without departing from the scope and spirit of the appended claims.

What is claimed is:

1. An articulated conveyor comprising:
   a continuous loop belt;
   a fixed first frame section and a second frame section operatively associated with said belt;
   carrier means for supporting and moving only said second frame section for horizontal linear translational movement relative to said fixed first frame section, wherein said second frame section is mounted upon and supported by said carrier means for horizontal linear translational movement in a direction substantially perpendicular to the longitudinal axis of said second frame section, and wherein said carrier means is selectively operative to linearly translate said second frame section relative to said fixed first frame section in a direction substantially perpendicular to the longitudinal axis of said fixed first frame section such that said first and second frame sections are maintained substantially in parallel relation during said linear translational movement;
   a third frame section joining said first and second frame sections, one end of said third frame section being pivotably mounted to one of said first or second frame sections, and the other end of said third frame section being pivotably and slidably mounted to the other of said first or second frame sections; and
   means associated with said first, second, and third frame sections for guiding said continuous loop belt for travel over said frame sections;

wherein said continuous loop belt is constrained by said guide means for travel across the top of said first, second, and third frame sections and for return underneath said first, second, and third frame sections; and whereby said second frame section can be linearly translationally moved upon said carrier means to provide for parallel offset of said second frame section with respect to said fixed first frame section, said first and second frame sections being maintained in substantially parallel relationship during said horizontal linear translational movement.

2. The conveyor of claim 1, wherein said means for guiding said continuous loop belt for travel over said frame sections comprises a first guide means, and further comprising:

a second means for guiding said endless-loop belt for travel between said first and third frame sections; and a third means for guiding said endless-loop belt for travel between said second and third frame sections;

wherein said first, second, and third guide means bear against a surface of said belt which is perpendicular to the top surface of said belt and parallel to the longitudinal axis of said belt, said second and third guide means being slidably mounted between said frame sections for translational movement in a direction substantially perpendicular to said direction of travel of said belt, wherein, when said second frame section is arcuately displaced with respect to said first frame section, said second and third guide means are slidably translationally moved toward the inside of the angles formed by said frame sections, whereby said second and third guide means guide said belt through smooth and continuous turns, rather than causing said belt to turn about single points, thereby effectively reducing the radius through which said belt must turn.

3. The apparatus according to claim 1, wherein said continuous loop belt comprises a continuous chain-link belt including articulated flights and center guide tabs which are perpendicular to the top surface of said belt and parallel to the longitudinal axis of said belt;

wherein said means associated with said first, second, and third frame sections for guiding said continuous loop belt for travel over said frame sections comprises upper and lower guide slots extending longitudinally along the upper and lower sides of said frame sections; and wherein said center guide tabs of said continuous chain-link belt slidably engage said longitudinal guide slots on said first, second, and third frame sections for guiding said continuous belt for travel across the top of said frame sections and for return underneath said first, second, and third frame sections.

4. The conveyor of claim 3, further comprising:

a first guide element comprising at least one central guide slot for guiding said endless-loop belt for travel between said first and third frame sections; and a second guide element comprising at least one central guide slot for guiding said endless-loop belt for travel between said second and third frame sections;

wherein said guide elements are slidably mounted between said frame sections for translational movement in a direction substantially perpendicular to the direction of travel of said belt;

wherein said guide slots slidably receive said center guide tabs; and wherein when said second frame section is arcuately displaced with respect to said first frame section said guide elements are slidably translationally moved toward the inside of the angles formed by said frame sections, and whereby said guide elements guide said belt through smooth and continuous turns, rather than causing said belt to turn about single points, thereby effectively reducing the radius through which said belt must turn.

5. In combination with an articulated conveyor of the type wherein an endless-loop belt travels across a first frame section and a second frame section, one end of the second frame section being pivotably mounted to the first frame section for arcuate movement with respect thereto, the conveyor further comprising a first guide means fixed with respect to said first and second frame sections for guiding said continuous loop belt for travel over said frame sections, the improvement which comprises:

a second guide means for guiding the endless-loop belt for travel between the first and second frame sections, said second guide means having opposing guide surfaces which bear against surfaces of the belt which are perpendicular to the top surface of the belt and parallel to the longitudinal axis of the belt, said second guide means being slidably mounted between the frame sections for translational movement independent of the relation between said frame sections in a direction substantially perpendicular to the direction of travel of the belt, wherein when the second frame section is arcuately displaced with respect to the first frame section said second guide means is slidably translationally moved toward the inside of the angle formed by the frame sections in response to the belt bearing against one of said guide surfaces, and whereby said second guide means guides the belt through a smooth and continuous turn, rather than causing the belt to turn about a single point, thereby effectively reducing the radius through which the belt must turn.

6. The combination as in claim 5, wherein the endless-loop belt of the articulated conveyor comprises a continuous chain-link belt including articulated flights and center guide tabs which are perpendicular to the top surface of said belt and parallel to the longitudinal axis of said belt, and the first guide means associated with the first and second frame sections for guiding the continuous loop belt for travel over the frame sections comprises upper and lower guide slots extending longitudinally along the upper and lower sides of the frame sections; said second guide means further comprising:

upper and lower central guide slots which slidably engage the center guide tabs of the chain-link belt as it travels between the upper and lower guide slots in the first and second frame sections.

7. In combination with an articulated conveyor of the type wherein an endless-loop belt travels across a first frame section and a second frame section, one end of said second frame section being pivotably mounted to said first frame section for arcuate movement with respect thereto, said conveyor further comprising a first guide means fixed with respect to said first and second frame sections for guiding said continuous loop belt for travel over said frame sections, the improvement which comprises:

- a second guide means for guiding said endless-loop belt for travel between said first and second frame sections, said second guide means having opposing guide surfaces which bear against surfaces of said belt which are perpendicular to the top surface of said belt and parallel to the longitudinal axis of said belt; and
- carriage means mounted between said frame sections and fixed with respect to one of said frame sections, said carriage means supporting said second guide means for translational movement independent of the relation between said frame sections in a direction substantially perpendicular to the longitudinal axis of said frame section to which said carriage means is fixed, wherein when said second frame section is arcuately displaced with respect to said first frame section said second gguide means is slidably translationally moved on said carriage means toward the inside of the angle formed by said frame sections in response to said belt bearing against one of said guide surfaces, and
- whereby said second guide means permits said belt to travel through a smooth and continuous turn, rather than causing said belt to turn about a single point, thereby effectively reducing the radius through which said belt must turn.

* * * * *